United States Patent [19]

Robinson

[11] Patent Number: 4,962,896
[45] Date of Patent: Oct. 16, 1990

[54] CONVEYOR HAVING A MATERIAL ATTENUATING DEVICE, AND A MATERIAL ATTENUATING DEVICE THEREFOR

[75] Inventor: Daniel J. Robinson, Louisville, Ky.

[73] Assignee: Carrier Vibrating Equipment Co., Louisville, Ky.

[21] Appl. No.: 296,195

[22] Filed: Jan. 12, 1989

[51] Int. Cl.$^5$ .............................................. B02C 1/00
[52] U.S. Cl. .................................................. 241/266
[58] Field of Search ............... 241/200, 189 R, 186 R, 241/186.4, 186.2, 265, 266, 84.3

[56] References Cited

U.S. PATENT DOCUMENTS 2,084,139  6/1937  Hamm et al. ....................... 241/200
2,827,241  3/1958  Downs ............................. 241/200 X

FOREIGN PATENT DOCUMENTS 636294  9/1936  Fed. Rep. of Germany ...... 241/200
294068  7/1928  United Kingdom ............... 241/200
485803  5/1938  United Kingdom ............... 241/266

Primary Examiner—Mark Rosenbaum
Attorney, Agent, or Firm—Jon C. Winger

[57] ABSTRACT

A conveyor for conveying material from one location to another location includes a device for contacting the material on the conveyor as the material is being conveyed to crush, break, pulverize, or otherwise attenuate the material. The material attenuating device is particularly well suited for use on vibratory conveyors but can also be used in conjunction with other types of conveyors such as belt conveyors and the like. The material attenuating device includes a lever pivotally mounted for oscillatory motion. The lever is connected to the conveyor, or to a drive for the conveyor. The free end of the lever has a tool for contacting the material on the conveyor as it is being conveyed as the lever oscillates to crush, break, pulverize or otherwise attenuate the material.

14 Claims, 2 Drawing Sheets

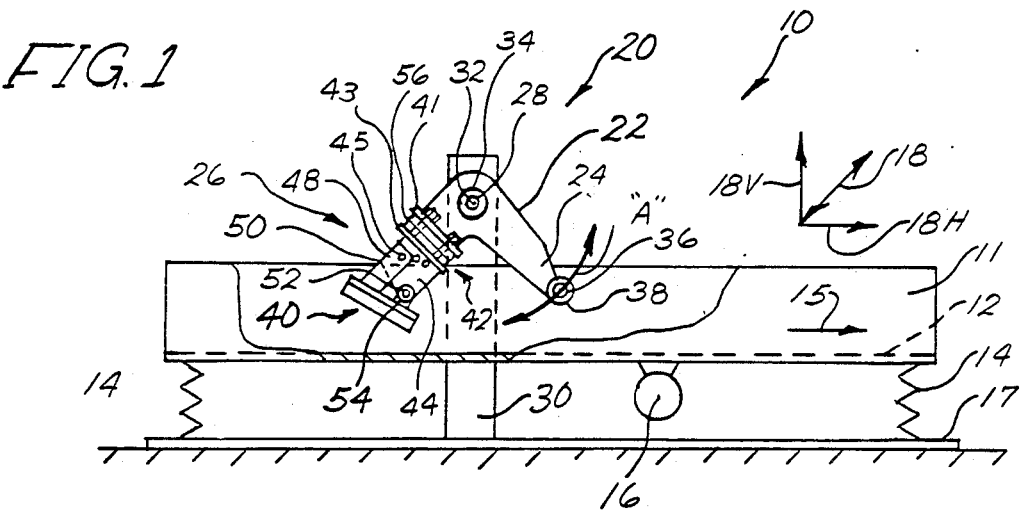
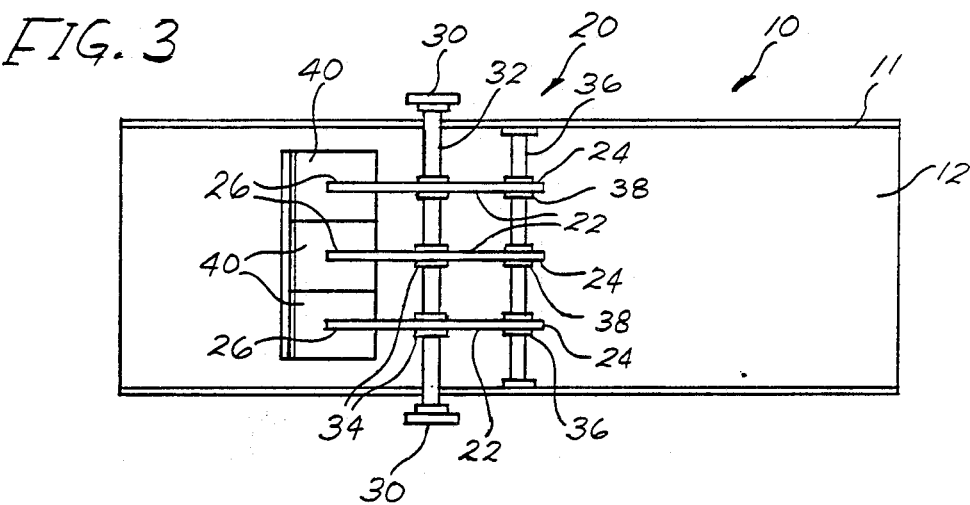
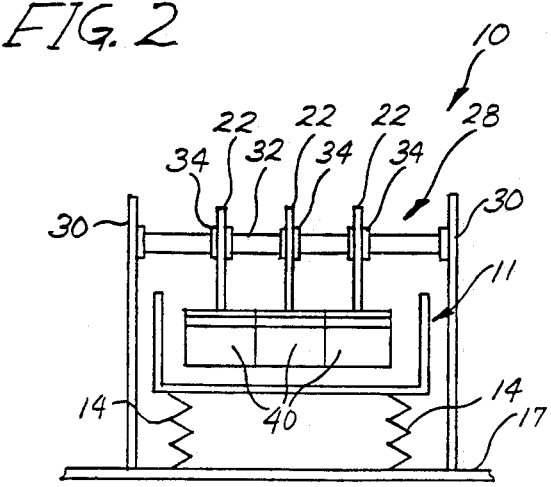
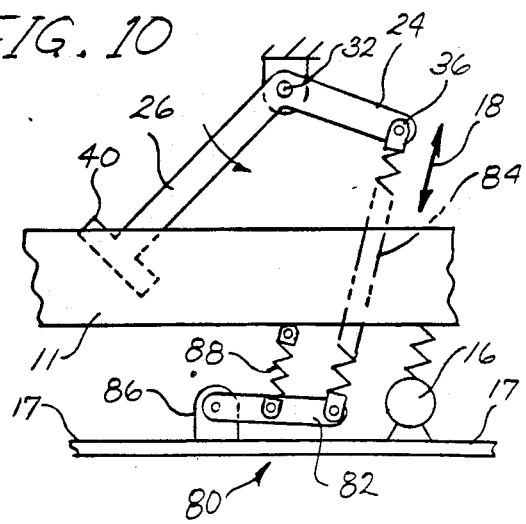

CONVEYOR HAVING A MATERIAL ATTENUATING DEVICE, AND A MATERIAL ATTENUATING DEVICE THEREFOR

BACKGROUND OF THE INVENTION

The present invention relates to conveyors, and more particularly to conveyors including devices for contacting the material being conveyed to perform work on the material.

In numerous manufacturing procedures, it is necessary that materials be crushed, pulverized or otherwise attenuated. For example, in a process using bulk material, it is often necessary to break-up any lumps before the bulk material can be used in a downstream operation, or be packaged. In another example, it is also desirable to break, or crush defective or worn-out products to salvage re-usable materials therefrom, or before they can be disposed of. In yet another example, in some processing of foodstuffs, such as nuts and corn, it is required that the shells be removed from the corn kernals or nuts.

The present invention recognizes these requirements and provides for the crushing, breaking, or otherwise attenuating a material as it is being conveyed from one site to another.

SUMMARY OF THE INVENTION

In one embodiment, the present invention provides an attenuating device for use with a conveyor for attenuating a material on the conveyor as the material is being conveyed, comprising a lever arm, a device for mounting the lever for pivotal motion about a fixed point with the pivot axis transverse to the conveying direction of the conveyor, a device for operatively interconnecting the lever arm to the conveyor or conveyor drive to transmit a force to the lever arm to cause it to oscillate about its fixed pivot axis, and a tool at the free end of the lever for contacting the material being conveyed to attenuate the material.

In another embodiment, the present invention provides a vibratory conveyor apparatus for conveying a material and for attenuating the material as it is being conveyed comprising an elongated conveyor device having a bed along which the material to be conveyed moves, means for imparting a vibratory force to the conveyor, a lever arm located over the conveyor bed, a device for mounting the lever arm for pivotal motion about a fixed point over the conveyor bed with the pivot axis generally transverse to the conveying direction, a device for interconnecting the lever arm to the conveyor for causing the lever arm to oscillate about its fixed pivot axis in response to the vibratory force imparted to the conveyor, and a tool at the free end of the lever for contacting the material being conveyed to attenuate the material.

BRIEF DESCRIPTION OF THE DRAWINGS

A better understanding of the invention will be had upon reference to the following description in conjunction with the accompanying drawings wherein like numerals refer to like parts throughout the several views and in which:

FIG. 1 is a schematic side view of the present invention in conjunction with a vibratory conveyor;

FIG. 2 is an end view as seen in the direction of arrows 2—2 in FIG. 1;

FIG. 3 is a top view of a portion of the embodiment of FIG. 1;

FIG. 10 is a schematic side view of still a further embodiment of the present invention.

DETAILED DESCRIPTION OF THE PREFERRED EMBODIMENT

Figure 4:
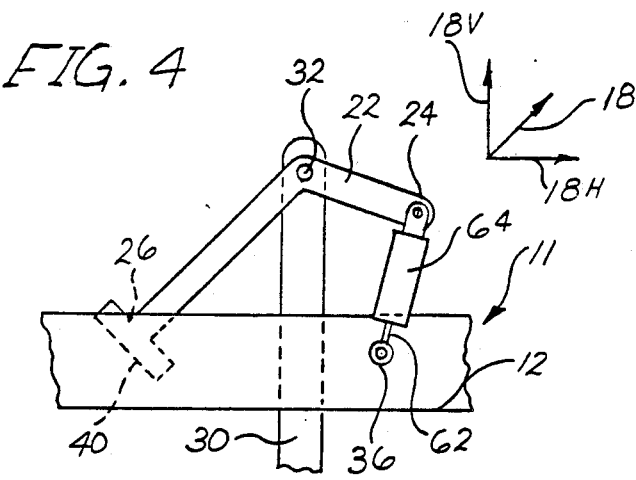
FIG. 4 is a schematic side view of an element of the present invention showing an alternative embodiment.

With reference to FIGS. 1–3, there is shown a vibratory conveyor, generally denoted as the numeral 10, which typically includes a trough structure 11 having a deck 12 along which material to be conveyed moves in a conveying direction denoted by the arrow 15. The vibratory conveyor 10 is mounted on isolation means 14 such as pneumatic bags, coil springs, leaf springs, or resilient pads, to a base 17 and includes vibration generating means 16 for imparting a conveying vibratory force to the conveyor trough structure 11. The vibratory force is depicted by the double-headed force vector 18 in FIG. 1. The drive means 16 can include virtually any type drive, for example, a crank drive, unbalanced weight drive, or eccentric device. Typically, the vibratory force vector 18 is inclined to the conveyor deck 12 and has a horizontal force vector 18H in the conveying direction along conveyor deck 12 and a vertical force vector 18V perpendicular to the conveying direction or conveyor deck 12. The vibratory conveyor 10 will not be further described for the reason that vibratory conveyors are well known in the art, and the type of vibratory conveyor does not constitute the invention per se as virtually any type can be utilized.

With continued reference to FIGS. 1–3, a material attenuating device, generally denoted as the numeral 20, is operatively associated with the vibratory conveyor 10. The attenuating device 20 comprises at least one lever arm 22 located over the conveyor deck 12 and mounted between its ends 24 and 26 for pivotal motion about a fixed pivot 28 over the conveyor deck 12 with the pivot axis transverse to the conveying direction 15. This can be accomplished by, for example, using vertical stanchions 30 mounted to a stable, non-vibrating platform, such as the conveyor base 17 which rests on the floor of the facility in which the conveyor 10 is used, to opposite lateral sides of the conveyor through 11 and extending upwardly to a location above the conveyor deck 12. The pivot 28 is shown as an axle 32 which extends transversely over the conveyor deck 12 and is attached at its opposite ends to the opposite stanchions 30. Alternatively, for example, the stanchions 30 could be replaced by hangers suspended from the ceiling of the facility in which the conveyor 10 is used and the axle 32 attached at its opposite ends to the hangers. The number of lever arms 22 used depends on various parameters such as, for example, the width of the conveyor deck 12. As shown in FIGS. 2 and 3, a plurality of lever arms 22 are used in spaced apart relationship from each other along the longitudinal axis of the axle 32. Each lever arm 22 is mounted on the axle 32 between its ends 24 and 26 by an appropriate bearing 34 so that the lever arm 22 can move in a pivotal motion relative to the axle 32. Because the stanchions 30 to which the axle 32 is mounted are not structually associated with vibrating trough 11, the axle 32 remains in a fixed location relative to the trough 11. The proximal end 24 of each lever arm 22 is interconnected to the conveyor trough 11 for movement therewith as the conveyor trough 11 vibrates, and also for pivotal motion so that the vibrating trough 11 will cause the lever arms 22 to pivot about the pivot 28. Toward this objective, a second axle 36 extends transversely over the deck 12 and is attached at its opposite ends to, for example, the opposite lateral walls of the conveyor trough structure 11 for movement with the trough 11 as it vibrates. The second axle 36 is parallel to and spaced from the first axle 32. The proximal end 24 of each lever arm 22 can be mounted to the second axle 36 by an appropriate bearing or elastomeric mount 38 so that the lever arm 22 can pivot about the second axle 36 as the second axle 36 moves in a vibratory arcuate motion with the vibratory trough structure 11 in the vibrating direction denoted by the double headed arcuate arrow "A".

With continued reference to FIGS. 1-3, a tool 40 is located at the distal end 26 of each lever arm 22 for movement with the lever arm 22 for periodically contacting the material moving on the conveyor deck 12 as the material moves beneath the tool 40. The specific configuration of the tool 40 will be dictated by the nature of the material and the specific attenuation operation to be performed on the material. For example, the tool 40 can be a blade, tines, or as shown, a head for imparting a blunt impulsive force to the material. The tool 40 can be removably mounted to the lever arm distal end 26 by any convenient fasteners such as nuts and bolts so that it can be readily removed. In addition, the tool 40 can be mounted to the lever arm distal end 26 so that the angle of attack thereof relative to the conveyor deck 12, and material conveyed thereon, can be adjusted to provide efficient attenuation of the material. As shown best in FIG. 1, the tool 40 is attached to the lever arm distal end 26 by a fixture, generally denoted as the numeral 42. A plate 41 is attached at the lever arm distal end 26 and the fixture 42 includes a plate 43 with a flange 44 extending perpendicular to the fixture plate 43. The fixture plate 43 is attached to the plate 41 at the lever arm distal end 26 by bolts received through appropriate apertures in the plates 41 and 43. A plurality of spaced apart bolt receiving apertures 45 are formed in the flange 44 in an arcuate array and a pivot pin receiving aperture 46 is formed through the flange 44 at the center of arc of the arcuate array of bolt receiving apertures 45. The tool 40 also includes a mounting flange 48 extending from its back side and having a bolt receiving aperture 50, and a pivot flange 52 also extending from its back side spaced from the mounting flange 48 and having a pivot pin receiving aperture 54. To attach the tool 40 to the lever arm distal end 26, the tool 40 is placed with the pivot pin receiving aperture 54 of the pivot flange 52 in registration with the pivot pin receiving aperture 46 in the plate 43, and with the bolt receiving aperture 50 in the mounting flange 48 in registration with a selected one of the bolt receiving apertures 45 in the plate 43. A pivot pin is installed through the registered pivot pin receiving apertures 46 and 54, and a mounting bolt is installed through the registered bolt receiving apertures 45 and 50. To adjust the angle of attack of the tool 40, the mounting bolt is removed and the tool 40 is pivoted about the pivot pin to a desired angle of attack, and the mounting bolt is reinserted through the bolt receiving aperture 50 in the mounting flange 48 and the other one of the bolt receiving apertures 45 now in registration with the bolt receiving aperture 50.

In addition, it is contemplated that the lever arm 22, under some circumstances of operation, should include force damper means, generally denoted as the numeral 56, depending upon various operating parameters such as, for example, the nature or physical properties of the material being conveyed and attenuated to prevent damage to the material attenuation device 20. Toward this objective, as shown the damper means 56 comprises a resilient, shock absorbing pad located between the plate 41 at the lever arm distal end 26 and plate 43 of the tool mounting fixture 42.

In operation, as the conveyor trough 11 is vibrated to convey the material along the conveyor deck 12, the proximal end 24 is caused to oscillate in an arcuate path (see double-headed arrow "A" in FIG. 1) and pivots about the second axle 36. This, in turn, causes the lever arm 22 to oscillate about the fixed pivot 28 defined by the axle 32 moving the lever arm distal end 26 and the tool 40 toward and away from the conveyor deck 12 and material conveyed thereon. As the tool 40 is moved toward the conveyor deck 12, it contacts the material between the tool 40 and conveyor deck 12 and attenuates the material.

With reference to FIG. 4, it is also contemplated that the lever arm proximal end 24 be interconnected to the second axle 36 by shock absorbing means, generally denoted by the numeral 60, to further protect the attenuating device 20 from possible damage. The shock absorbing means 60 can be virtually any appropriate device such as a resilient body, and is shown as a pneumatic or hydraulic cylinder device having its operating rod 62 pivotally connected to the second axle 36 and its cylinder 64 pivotally connected to the proximal end 24 of the lever arm 22. The shock absorbing device 60 should be oriented with the axis of movement of its operating rod 62 and cylinder 64 aligned with the resultant vibrating force vector 18 and, therefore, the motion of the conveyor trough 11.

Figure 5:
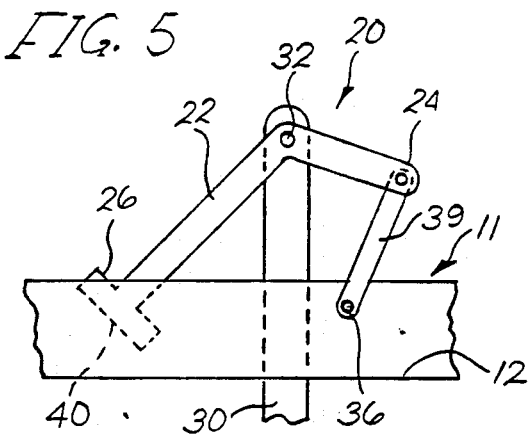
FIG. 5 is a schematic side view of an element of the present inveniton showing yet another alternative embodiment.

With reference to FIG. 5, it is further contemplated that the proximal end 24 of the lever arm 22 be connected to the second axle 36 by a link bar 39 pivotally connected at one of its ends to the proximal end 24 of the lever arm 22 and pivotally connected at the other of its ends to the second axle 36 such that the lever arm 22 and link bar 39 form a two-bar mechanism.

Figure 6:
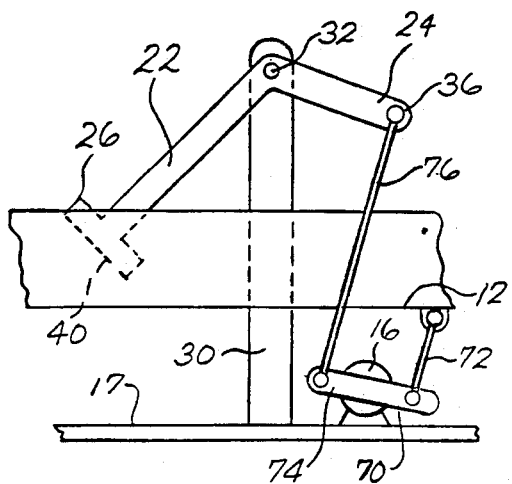
FIG. 6 is a schematic side view of another embodiment of the present invention.

With reference now to FIG. 6, there is shown another embodiment of the present invention which is similar to the embodiment of FIGS. 1-3 in most respects. The features of the embodiment of FIG. 6 which are identical to the embodiment of FIGS. 1-3 are denoted by identical numerals and, for the sake of brevity, the description thereof will not be repeated. In the embodiment of FIG. 6, the second axle 36 is not attached to the conveyor trough 11 as it is in the embodiment of FIGS. 1-3. Instead, the second axle 36 is movable or driven independently of the conveyor trough 11, but is connected directly to the vibration generating means 16. For example, if the vibration generating means 16 is an eccentric or crank drive device of the type having an eccentric or crank arm 70 interconnected to the trough 11 by a connecting rod 72 to vibrate the trough 11, an additional eccentric or crank arm 74 can be added to the vibration generating means 16 with a connecting rod 76 interconnecting the additional crank arm 74 to the second axle 36. Preferably, the connecting rod 72 and additional connecting rod 76 are parallel to each other. Thus, the vibrating means 16 imparts a force to the trough 11 through the connecting rod 72 and also a force to the lever arm 22 through the connecting rod 76.

Figure 7:
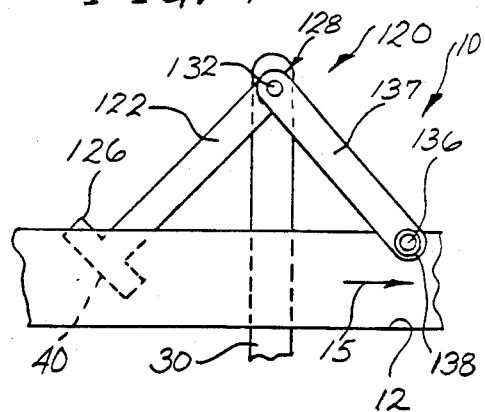
FIG. 7 is a schematic side view of yet another embodiment of the present invention.
Figure 8:
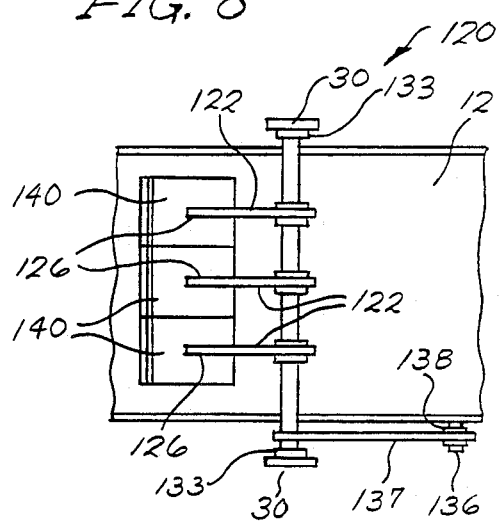
FIG. 8 is a top view of a portion of embodiment of FIG. 7.

FIGS. 7 and 8 illustrate a further embodiment of the present invention including a material attenuating device, generally denoted as the numeral 120, operatively associated with the vibratory conveyor device 10. The attenuating device 120 comprises at least one lever arm 122 located over the conveyor deck 12 and mounted at its proximal end 124 for pivotal motion about a fixed point 128 over the conveyor deck 12 with the pivot axis transverse to the conveying direction 15. This can be accomplished by using the vertical stanchions 30 as used in the embodiment of the attenuation device 20 of FIGS. 1-3. The pivot 128 is shown as an axle 132 which extends transversely over the conveyor deck 12 and is mounted at its opposite ends by bearings 133 to opposite stanchions 30 for rotation about its longitudinal axis 128. As shown best in FIG. 8, a plurality of lever arms 122 are spaced apart from each other along the longitudinal axis of the axle 132. Each lever arm 122 is attached to the axle 132 at its proximal end 124 for pivotal motion with the axle 132. An elastomeric mount can be used to attach the proximal end 124 of the lever arm 122 to provide some relative motion, or "give" between the lever arm 122 and axle 132 to reduce the chances of damage to the attenuating device 120. Because the stanchions 30 are not structurally associated with the vibrating trough 11, the axle 132 remains in a fixed location relative to the trough 11. The axle 132 is interconnected to the conveyor trough 11 so that the vibrating trough 11 will cause the axle 132 to pivot about its longitudinal axis and, thereby, cause the lever arms 122 to pivot with the axle 132. Toward this objective, a second or stub axle 136 is attached to the conveyor trough 11 projecting transversely of the conveyor trough 11 from one lateral wall of the trough 11 for movement with the trough 11 as it vibrates. The stub axle 136 is parallel to and spaced from the first axle 132. A link arm 137 is affixed at one end, the proximal end, to the first axle 132 and is journal mounted at the other end, the distal end, to the stub axle 136 by an appropriate bearing or elastomeric mount 138. Therefore, the link arm 137 can pivot about the stub axle 136 as the stub axle 136 moves in a vibratory motion with the vibrating trough structure 11, and the first axle 132 is caused to pivot about its longitudinal axis in turn causing the lever arms 122 to pivot with the first axle 132.

As with the embodiment of FIGS. 1-3, a tool 40 is located at the distal end 126 of the lever arm 122 for movement with the lever arm 122 for periodically contacting the material moving on the conveyor deck 12.

Figure 9:
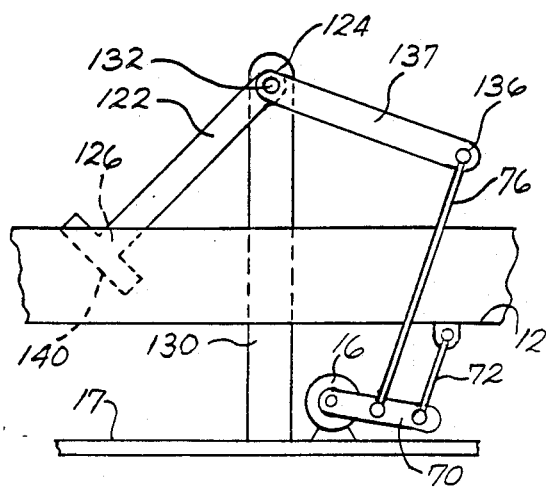
FIG. 9 is a schematic side view of yet a further embodiment of the present invention.

With reference to FIG. 9, there is shown another embodiment of the present invention which is similar to the embodiment of FIGS. 6, 7, and 8 in most respects. The features of the embodiment of FIG. 9 which are identical to the embodiment of FIGS. 7 and 8 are denoted by identical numerals and, for the sake of brevity, the description thereof will not be repeated. In the embodiment of FIG. 9, the stub axle 136 is not attached to the conveyor trough 11 as it is in the embodiment of FIG. 7 and 8. Instead, the second axle 36 is mounted independently of the conveyor trough 11, but is connected directly to the vibration generating means 16. For example, if the vibration generating means 16 is an eccentric or crank drive device of the type having an eccentric or crank arm 70 interconnected to the trough 11 by a connecting rod 72 to vibrate the trough 11, an additional connecting rod 76 can be included interconnecting the crank arm 70 to the axle 136 at the distal end of the link arm 137. The additional connecting rod 76 can be connected to the crank arm 70 adjacent to the connecting rod 72. Preferably, the connecting rod 72 and additional connecting rod 76 are parallel to each other. Thus, the vibrating means 16 imparts a force to the trough 11 through the connecting rod 72 and also a force to the lever arm 122 through the link arm 137 and additional connecting rod 76.

With reference to FIG. 10, there is shown a still further embodiment of the present invention which is similar to the embodiment of FIGS. 1-3 in most respects. The features of the embodiment of FIG. 10 which are identical to the embodiment of FIGS. 1-3 are denoted by identical numerals and, for the sake of brevity, the description thereof will not be repeated. In the embodiment of FIG. 10, the second axle 36 is not directly attached to the conveyor trough 11 as it is in the embodiments of FIGS. 1-3, but it is still movable or by the conveyor trough 11. The lever arms 22 is caused to oscillate about the fixed pivot 28 defined by the axle 32 by a slave linkage, generally denoted as the numeral 80, which interconnects the second axle 36 to the conveyor trough 11. The slave linkage 80 is illustrated as comprising a two bar linkage including a first link bar 82 pivotally connected at its proximal end to the proximal end of a second link bar 84. The first link bar 82 is pivotally connected at its distal end to a pivot mount 86 affixed to the base 17, and the second link bar 84 is pivotally connected at its distal end to the second axle 36 at the proximal end 24 of the lever arm 22. The conveyor trough 11 is connected to the slave linkage 80 by a third link bar 88 pivotally connected at one end to the trough 11 and pivotally connected at the other end to the first link bar 82 between its proximal and distal ends. Preferably, the second link bar 84 and third link bar 88 are parallel to each other and parallel to the force vector 18 imparted to the conveyor trough 11 by the vibration generating means 16.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

I claim:
1. A vibratory conveyor comprising:
   a. a trough structure along which material to be conveyed moves;
   b. a vibratory generating device for imparting a vibratory force to the conveyor trough structure;
   c. an attenuating device for attenuating material moving on the conveyor trough structure as the material is being conveyed comprising:
      a lever arm over the conveyor trough structure;
      means for mounting the lever arm for pivotal motion about a fixed point located directly over the trough structure;
      means interconnecting the lever arm to the trough structure for transmitting the vibratory motion from the trough structure to the lever arm and for causing the lever arm to pivot about the fixed point as the conveyor trough structure vibrates conveying the material, and for causing a distal end of the lever arm to move out of phase with the vibratory motion of the conveyor trough such that as the vibrating conveyor trough structure moves upwardly, the distal end of the lever arm moves downwardly toward the conveyor trough structure and as the vibratory conveyor trough structure moves downwardly, the distal end of the lever arm moves upwardly away from the conveyor trough structure; and, a tool at the distal end of the lever arm for movement with the lever arm and attenuating the material moving on the conveyor trough structure.

2. The vibratory conveyor of claim 1, further comprising means for pivotally mounting the tool at the distal end of the lever arm for selectively changing the angle of the attack of the tool relative to the trough structure.

3. The attentuating device of claim 1, wherein the pivot axis of the lever arm is transverse to the conveying direction of the conveyor trough structure.

4. The attentuating device of claim 3, wherein:
the lever arm pivot mounting means comprises a first axle located above the conveyor generally transverse to the conveying direction of the conveyor trough structure; and,
the lever arm is mounted to the first axle for pivotal movement thereon about the longitudinal axis of the first axle.

5. The attenuating device of claim 4, wherein:
the lever arm is mounted between its proximal and distal ends to the first axle; and,
the means interconnecting the lever arm to the conveyor trough structure interconnects the proximal end of the lever arm to the conveyor trough structure.

6. The attenuating device of claim 4, wherein the means interconnecting the lever arm to the conveyor trough structure comprises:
a second axle connected to the conveyor trough structure for vibratory motion therewith, the axis of the second axle being transverse to the conveying direction of the conveyor; and,
the lever arm is pivotally interconnected to the second axle.

7. The attenuating device of claim 4, wherein the means interconnecting the lever arm to the conveyor trough structure comprises shock absorbing means.

8. The attenuating device of claim 4, wherein the means interconnecting the lever arm to the conveyor trough structure comprises a link bar pivotally interconnected at one of its ends to the lever arm and pivotally interconnected at the other of its ends to the conveyor trough structure.

9. The attenuating device of claim 3, wherein:
the lever arm pivot mounting means comprises a first axle located above the conveyor generally transverse to the conveying direction of the conveyor for movement about its longitudinal axis;
the lever arm is attached to the first axle for movement with the first axle about the longitudinal axis of the first axle; and,
the means for causing the lever arm to pivot comprises means interconnecting the first axle to the conveyor trough structure for transmitting motion from the conveyor to the first axle.

10. The attenuating device of claim 9, wherein the means interconnecting the first axle to the conveyor trough structure comprises shock absorbing means.

11. The attenuating device of claim 9, wherein the means interconnecting the first axle to the conveyor trough structure comprises a link arm attached at one of its ends to the first axle and pivotally interconnected at the other of its ends to the conveyor trough structure.

12. The attenuating device of claim 11, wherein the means interconnecting the first axle to the conveyor trough structure further comprises:
a second axle connected to the conveyor trough structure for vibratory motion therewith, the axis of the second axle being transverse to the conveying direction of the conveyor; and,
the link arm is pivotally interconnected at the other of its ends to the second axle.

13. The attentuating device of claim 11, wherein the means interconnecting the first axle to the conveyor trough structure means further comprises a link bar pivotally interconnected at one of its ends to the other end of the link arm and pivotally internconnected at the other of its ends to the conveyor trough structure.

14. The vibratory conveyor device of claim 1, further comprising damper means located between the tool and the distal end of the lever arm.

* * * * *